United States Patent [19]

Sawdo et al.

[11] 3,831,287

[45] Aug. 27, 1974

[54] APPARATUS WITH ADJUSTABLE PERIOD FOR MEASURING SMALL DEVIATIONS FROM A TRUE HORIZONTAL PLANE

[75] Inventors: Richard M. Sawdo, Stow; Ivan Simon, Belmont, both of Mass.

[73] Assignee: Arthur D. Little, Inc., Cambridge, Mass.

[22] Filed: Feb. 26, 1973

[21] Appl. No.: 335,557

[52] U.S. Cl. .................. 33/344, 33/366, 308/10
[51] Int. Cl. ............................. G01c 9/00
[58] Field of Search ......... 33/344, 300, 366; 308/10

[56] References Cited
UNITED STATES PATENTS

| | | | |
|---|---|---|---|
| 2,102,409 | 12/1937 | Fans | 308/10 UX |
| 3,512,851 | 5/1970 | Love | 308/10 |
| 3,791,704 | 2/1974 | Pepper | 308/10 |

Primary Examiner—William D. Martin, Jr.
Attorney, Agent, or Firm—Bessie A. Lepper

[57] ABSTRACT

An apparatus adapted continuously to measure and record small deviations from a true horizontal plane such as those deviations which may occur continuously or recurrently as a result of ground motion and the like. The apparatus comprises a diamagnetic body suspended in a magnetic field of a configuration which constrains the body radially but permits it to move axially within certain limits. The amount of axial movement is used as a measure of horizontal deviation. The suspension is frictionless, and the apparatus may be made to be relatively rugged and stable over extended periods of time. Adjustable magnetic force restoring means are provided to change and control the natural period of the instrument to optimize it performance over a wide range of applied force.

8 Claims, 9 Drawing Figures

PATENTED AUG 27 1974　　3,831,287

APPARATUS WITH ADJUSTABLE PERIOD FOR MEASURING SMALL DEVIATIONS FROM A TRUE HORIZONTAL PLANE

This invention relates to instruments for measuring small deviations from a true horizontal plane, and more particularly to such devices 1 since they are of essentially the same configuration.

The instrument of this invention is designed continuously to measure and record deviations from a true horizontal reference plane from being exactly orthogonal to the vector of local gravity. The term "true horizontal plane" is used herein to define a plane which is exactly perpendicular to the local vertical direction such as defined for example by a plumb line. Thus, in effect, the instrument measures the horizontal component of the acceleration of gravity. The magnitude of any such deviations to be measured may be extremely small, and the phenomena to be evaluated which bring about such deviations may have either relative long periods or short periods, or be aperiodic and proceed at very slow rates. Thus, such instruments must have reliable long-term stability. Moreover, since the period is an inverse function of the force to which the instrument responds and since it is desirable to use one instrument to measure a range of forces, it would be desirable to have such an instrument with an adjustable period. Instruments suitable for such measurements are generally referred to as "tiltmeters," and this generic term will be used hereinafter for convenience in describing the apparatus of this invention.

Tiltmeters have a number of uses in such fields as geophysics, vulcanology and civil engineering. For example, in geophysics tiltmeters are used to measure the slow gradual shifts in faults. In civil engineering tiltmeters are used to measure the movement of the earth associated with large excavations and the building dams, to monitor the stability of slopes, and to make measurements in rock mechanics such as are required in tunneling operations, etc. Tiltmeters are also used to accurately position large scientific apparatus such as telescopes, particle accelerators, etc.

Until recently, tiltmeters were constructed such that they were based on the measurement of the change in level of water or mercury in a tube or on the movement of a pendulous mass suspended on fine fibers or elastic hinges. Recently a new type of tiltmeter based upon the use of an elongated diamagnetic body levitated by magnetic forces has been disclosed and found wide use. (See U.S. Pat. Nos. 3,492,738 and 3,552,028.) This type of tiltmeter is free of friction of external and internal origins, is highly responsive, stable over an extremely wide temperature range, and rugged. Moreover, it may be made in such small sizes as to permit it to be lowered into bore holes.

In the prior art tiltmeters using a diamagnetic mass, the natural period, and consequently the sensitivity and range, was fixed for any one instrument and determined by the shape of the pole pieces of the magnets providing the required magnetic forces. In many applications for tiltmeters it would be desirable to have some way in which to adjust and control the period of an instrument to meet varying demands made upon it. Such adjustment and control is also particularly desirable for tiltmeters used in pairs or larger numbers since it is very difficult to machine two or more sets of pole pieces to give precisely the same restoring forces and hence the same periods.

It is therefore a primary object of this invention to provide an improved tiltmeter using a levitated diamagnetic mass which incorporates means for adjusting the natural period of the tiltmeter. It is another object to provide tiltmeters of the character described which may be readily matched for use in pairs. Other objects of the invention will in part be obvious and will in part be apparent hereinafter.

In the improved tiltmeter of this invention, the elongated diamagnetic mass is formed with a peripheral groove midway along its axis, and an adjustable magnetic protrusion, the axis of which is normal to the axis of the diamagnetic body, is extended into the magnetic field which provides the levitating forces and aligned with the groove. By adjusting the position of the protrusion relative to the groove, the natural period of the tiltmeter may be varied.

The invention accordingly comprises the features of construction, combinations of elements, and arrangement of parts which will be exemplified in the construction hereinafter set forth, and the scope of the invention will be indicated by the claims.

For a fuller understanding of the nature and objects of the invention, reference should be had to the following detailed description taken in connection with the accompanying drawings in which FIG. 1 is a somewhat diagrammatic cross section through the pole pieces of the tiltmeter of this invention illustrating the establishment of the distribution of magnetic forces required to levitate the diamagnetic body;

Figure 1:
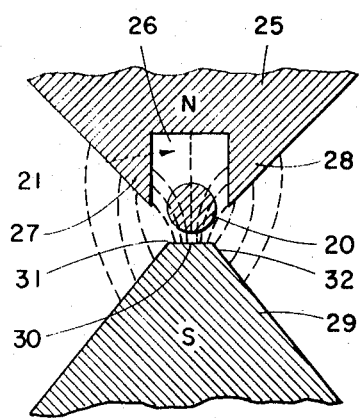

FIG. 1 illustrates how a mass of a diamagnetic material such as an elongated cylinder 20 may be suspended in a properly designed magnetic field 21. In order to achieve the desired levitation of the mass 20, it is necessary to provide a magnetic field which has a vertical gradient decreasing upwardly, as well as symmetrical transverse gradients which are substantially uniform along the axis of the mass and decreasing outwardly. In FIG. 1 the lines of flux have been drawn in to illustrate the flux gradient, and from these lines it will become apparent that the magnet is so arranged as to strongly constrain the diamagnetic mass in the transverse direction while leaving it free to move without friction in the axial direction. As will become apparent in the following detailed description, the axial movement is measured and used as a means for evaluating deviation of the suspended mass from the true horizontal plane.

The desired magnetic field is achieved by use of an upper pole piece 25 in which there is a groove 26 having edges 27 and 28 which, according to well-known physical principles, effect a concentration of the magnetic flux. A lower pole piece 29 is provided and in the modification of FIG. 1 is seen to terminate in a narrow, flat surface 30, which provides edges 31 and 32 aligned with edges 27 and 28 to achieve the desired lateral flux gradient as well as the vertical gradient. It will be appreciated that these edges need not be sharp but may be rounded to optimize magnetic saturation in the pole-piece material.

The principles governing the levitation of the diamagnetic mass, types of diamagnetic materials, sizes of the mass and types of magnets usable are all discussed in detail in U.S. Pat. No. 3,492,738, the pertinent parts of which are included herein by reference.

In the tiltmeter of this invention, the diamagnetic mass 20 in the form of an elongated body or rod has a peripheral groove midway along its lengths. Two embodiments of such a groove are illustrated in FIGS. 2 and 3, groove 35 of FIG. 2 being of a curved configuration and groove 36 of FIG. 3 being of an essentially rectangular configuration.

Figure 2:
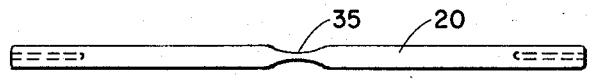
FIGS. 2 and 3 are side elevational views of two embodiments of the elongated diamagnetic mass.
Figure 3:
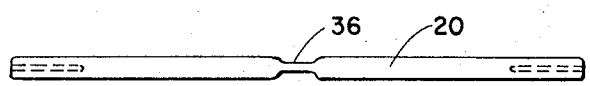
Figures 4, 5:
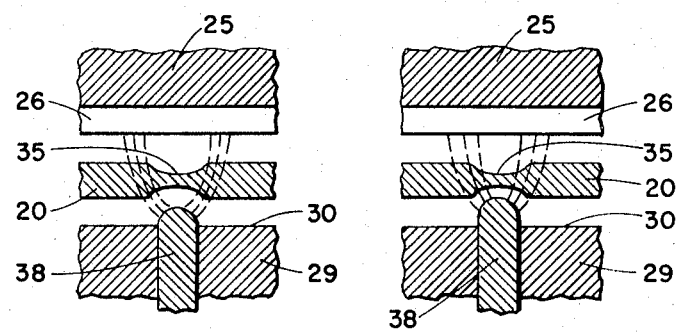
FIGS. 4 and 5 illustrate the manner in which the adjustable magnetic protrusion in association with the grooved diamagnetic body makes it possible to vary the natural period of tiltmeter.

Using the pole piece configurations of FIG. 1 and the groove configuration of FIG. 2 as exemplary, it is possible to show with reference to FIGS. 4 and 5, how the magnetic protrusion 38 functions as a restoring force and thereby serves as a means for varying and adjusting the period of the tiltmeter. By raising the end of protrusion 38, the axis of which is normal to the axis of mass 20, above the flat surface 30 of pole piece 29 and into the magnetic field such that it is aligned with and spaced from the edges of groove 35, a flux gradient (illustrated diamgrammatically by the dotted lines) is established. The strongest flux exists at or near the two edges of groove 35. Therefore as mass 20 shifts from its central position to either right or left, it encounters the stronger magnetic fields at the ends of the groove, its axial motion is opposed and its period (time for restoration to its null or central position) is determined. As will be apparent from a comparison of FIGS. 4 and 5, which represent two different positions of magnetic protrusion 38 with respect to groove 35, the closer protrusion 38 is brought to groove 35, the stronger are the flux lines in the area of the groove ends, the greater is the restoring force, and the shorter is the natural period of the instrument. Thus by varying the proximity of the protrusion to the groove, the performance of the instrument is varied.

It will generally be preferable to adjust the protrusion to give the tiltmeter a longer period for weaker forces and a shorter period for stronger forces. In using the instrument, the shorter periods are used when greater tilt ranges are to be measured. The periods of the tiltmeter may be thus adjusted over a wide range, e.g., from about one to about six seconds.

Figure 6:
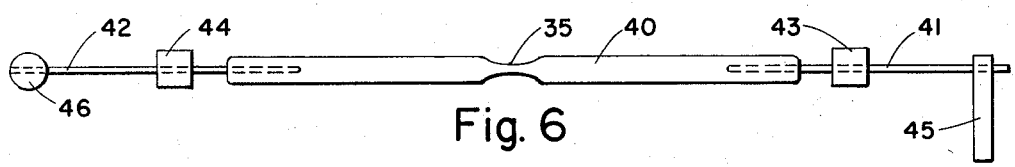
FIG. 6 is a side elevation view of one embodiment of a float member comprising the elongated diamagnetic mass and its associated components attached.
Figures 7, 8:
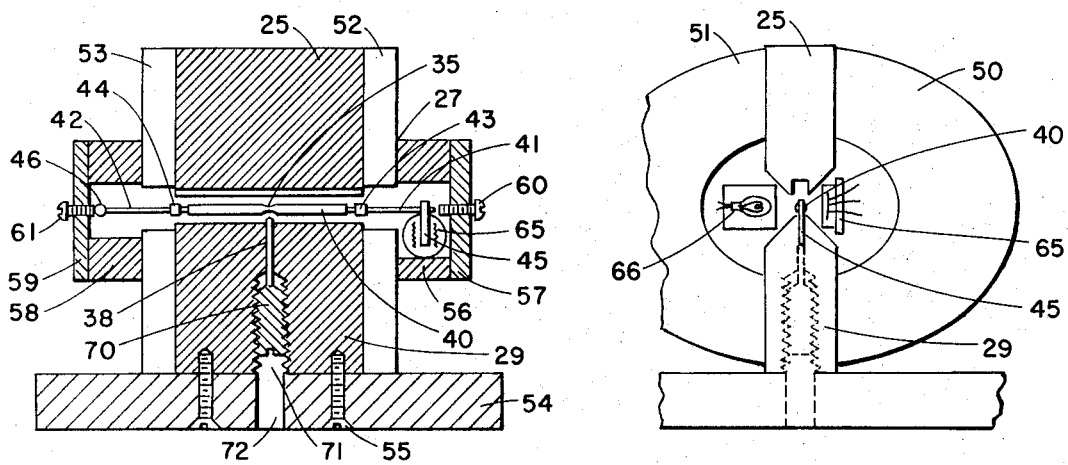
FIG. 7 is a cross section through a tiltmeter constructed in accordance with this invention.
FIG. 8 is an end view of the tiltmeter of FIG. 7 with a portion of the optical block removed.

A diamagnetic float with exemplary associated components is shown in FIG. 6 and a tiltmeter constructed in accordance with this invention and embodying the diamagnetic float of FIG. 6 is shown in FIGS. 7 and 8. The float of FIG. 6 comprises the diamagnetic mass, typically a graphite rod 40 with central groove 35, and thin rods 41 and 42 (typically formed of a nonmagnetic material such as aluminum) affixed to each end of the graphite rod such as by insertion into holes drilled into the ends of the rod. Small damping slugs 43 and 44 of aluminum are affixed to the rods at positions so that they extend slightly beyond the ends of the pole pieces (see FIG. 7). A flag 45, formed of a thin optically opaque, nonmagnetic foil (e.g., aluminum foil) is affixed near the end of rod 41 and a balance member 46 of a weight equal to flag 45 is affixed near the end of rod 42 to counterbalance the weight of flag 45.

In the tiltmeter of FIG. 7, the pole pieces are identified by the same reference numerals as used in FIG. - SINCE THEY ARE OF ESSENTIALLY THE SAME CONFIGURAITON. Horseshoe magnets 50 and 51, each of which may be a series of several magnets, are affixed to the sides of pole pieces 25 and 29 to provide the required magnetic field. The pole pieces 25 and 29 are encased in end plates 52 and 53 and bottom pole pice 29 is mounted on a nonmagnetic mounting block 54 through suitable screws 55. A housing 56 with a cover plate 57 is attached to end plate 52 and a similar housing 58 with a cover plate 59 is attached to end plate 53. The ends of rods 41 and 42 extend into the volumes defined by these housings. End stop adjustment screws 60 and 61 extend through cover plates 57 and 59, respectively, and the ends of these screws are aligned with the ends of rods 41 and 42 so that the extent of the axial movement of the float is suitably limited.

Deviations from the true horizontal are measured by determining relative motion between the diamagnetic mass along its axis and the support to which the pole pieces are firmly affixed. To do this, housing 56 and its cover member 57 define an optical block which houses a differential photoresistor device 65 and a source of radiant energy, e.g., a small light bulb 66. In keeping with known design and construction of such devices, the differential photoresistor has two parallel photosensitive areas. When the graphite rod 40 (diamagnetic mass) is aligned to be at its null point, flag 45 is so positioned between the light and the photocells that light from source 66 falls equally on the two areas.

The magnetic protrusion 38 is a small diameter rod formed of a magnetic material, i.e., iron, and is attached to a large diameter threaded member 70 which is adapted to engage threads in a hole 71 cut into pole piece 29 at a point midway along its length to correspond to the position occupied by the groove in the magnetic mass when it is positioned at its null point in the magnetic field. The end of threaded member 70 is suitably configured for being engaged by an instrument inserted through the hole 72 in block 54 for raising or lowering protrusion 38 which passes up through an opening extending from the top of hole 71 to the surface of pole piece 29. The fit between protrusion 38 and this opening is snug but not tight. The protrusion 38 should have a diameter which is slightly less than the width of the groove in the rod, and it may be rounded at the end which extends above the pole piece. It is also within the scope of this invention to locate the protrusion in the upper pole piece 25 in a similar manner.

Figure 9:
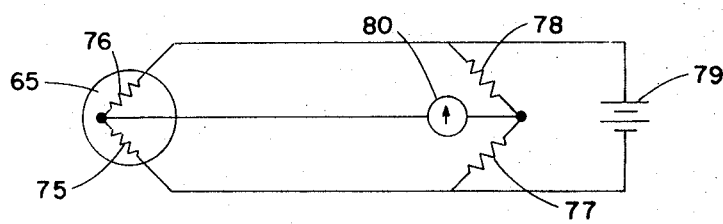
FIG. 9 is a simplified diagram showing the bridge circuit of the deviation measuring means.

In the operation of the tiltmeter, the two photosensitive areas of dual photoresistive device 65 provide resistor 75 and 76 of a typical Wheatstone bridge circuit (FIG. 9), the remaining resistors 77 and 78 being set at some suitable, predetermined value. A DC current is supplied to the circuit such as by battery 79 and a voltmeter 80 is used to bridge the two opposing halves of the circuit. When the diamagnetic mass is in its null position, i.e., there is no deviation from the level position, the arms of the Wheatstone bridge are balanced and the voltmeter will not register any voltage. However, when motion is sensed by the tiltmeter, the flag 45 on end rod 43 will move relative to the dual photoresistive device 65 and the amount of light which strikes one of the photoconductive areas will be different from that which strikes the other. Therefore resistance 75 will be different from resistance 76, a fact which will be registered by voltmeter 80. Since the change in voltage measured by voltmeter 80 is a function of the amount of axial motion experienced by the diamagnetic mass it is a measurement of the amount of movement experienced by the platform (e.g., earth) on which the tiltmeter rests. The period of the instrument is the time required for the magnetic mass to oscillate about its null point through the action of the restoring force. As explained above, the protrusion provides the means to furnish this restoring force and the position of the protrusion with respect to the groove in the diamagnetic mass determines the magnitude of such force and hence the natural period of the tiltmeter.

It will thus be seen that the objects set forth above, among those made apparent from the preceding description, are efficiently attained and, since certain changes may be made in the above construction without departing from the scope of the invention it is intended that all matter contained in the above description or shown in the accompanying drawings shall be interpreted as illustrative and not in a limiting sense.

We claim:

1. In an instrument for measuring deviations from a true horizontal plane in which a diamagnetic mass is levitated for axial movement in a magnetic field defined between two pole pieces, the improvement comprising an elongated diamagnetic mass with a centrally located peripheral groove and a magnetic protrusion extending through one of said pole pieces into said magnetic field and arranged to be moved along an axis normal to the axis of said diamagnetic mass to adjust the proximity of said protrusion to said groove, whereby the force required to restore said mass to its null position after experiencing axial motion, and hence the natural period of said instrument, may be varied.

2. An apparatus for measuring deviation from a true horizontal plane, comprising in combination
   a. an elongated diamagnetic mass having a peripheral groove midway along its axis;
   b. magnetic field generating means adapted to levitate said diamagnetic mass in a horizontal plane along its axis, said magnetic field generating means including an upper pole piece defining a horizontal channel and a lower pole piece of a configuration to define with said upper pole piece a magnetic field having a flux concentration which is essentially symmetrical along the axis of said mass and which exhibits a vertical gradient decreasing upwardly and transverse gradients decreasing outwardly whereby said mass is strongly constrained transversely but is free to move axially;
   c. a magnetic protrusion extending through one of said pole pieces into said magnetic field and arranged to be moved along an axis normal to the axis of said diamagnetic mass to adjust the proximity of said protrusion to said groove, whereby the force required to restore said mass to its null position after experiencing axial motion, and hence the natural period of the apparatus, may be varied;
   d. means for damping said axial movement of said mass; and
   e. means for detecting axial movement of said mass as a measure of the inclination of the apparatus from said true horizontal plane.

3. An apparatus in accordance with claim 2 wherein said groove has a rounded configuration.

4. An apparatus in accordance with claim 2 wherein said groove has an essentially rectangular configuration.

5. An apparatus in accordance with claim 2 wherein said elongated diamagnetic mass is part of a float comprising an elongated graphite rod having nonmagnetic rod members affixed to each end thereof, one of said rod members having a nonmagnetic optically opaque flag affixed at its end and the other of said rod members having a counterbalance for said flag affixed to its end, and a damping slug affixed to each of said rod members serving as said means for damping said axial movement of said mass.

6. An apparatus in accordance with claim 5 wherein said means for detecting axial movement of said mass comprises a source of radiant energy and dual photoresistor means having two photoconductive areas positioned so that said flag interrupts the transmission of radiant energy from said source to said photoresistive means, and means to measure the difference in resistance of said areas when said flag is moved through axial movement of said float.

7. An apparatus in accordance with claim 2 wherein said protrusion extends through said lower pole piece.

8. An apparatus in accordance with claim 2 wherein said protrusion has a diameter slightly less than the width of said groove.

* * * * *